United States Patent
Veikle

(10) Patent No.: US 10,806,084 B2
(45) Date of Patent: Oct. 20, 2020

(54) SYSTEM FOR UNLOADING HARVESTED CROP FROM AN AGRICULTURAL HARVESTER

(71) Applicant: CNH Industrial America LLC, New Holland, PA (US)

(72) Inventor: Eric E. Veikle, Lititz, PA (US)

(73) Assignee: CNH Industrial America LLC, New Holland, PA (US)

(*) Notice: Subject to any disclaimer, the term of this patent is extended or adjusted under 35 U.S.C. 154(b) by 106 days.

(21) Appl. No.: 15/973,295

(22) Filed: May 7, 2018

(65) Prior Publication Data
US 2019/0335665 A1 Nov. 7, 2019

(51) Int. Cl.
*A01D 90/10* (2006.01)
*A01F 12/46* (2006.01)

(52) U.S. Cl.
CPC .............. *A01D 90/10* (2013.01); *A01F 12/46* (2013.01)

(58) Field of Classification Search
CPC ................ A01D 90/10; A01D 41/1217; A01D 41/1208; A01D 61/00; A01D 61/008; A01F 12/46; A01F 12/60; B65G 15/08; B65G 19/14; B65G 65/42
See application file for complete search history.

(56) References Cited

U.S. PATENT DOCUMENTS

| | | | |
|---|---|---|---|
| 1,927,281 A | 9/1933 | Fleming | |
| 4,282,703 A * | 8/1981 | Wilson | A01F 12/10 56/14.6 |
| 4,333,561 A | 6/1982 | Schlegel | |
| 4,678,076 A | 7/1987 | Nenakhov et al. | |
| 5,975,283 A | 11/1999 | Riffe | |
| 6,012,272 A * | 1/2000 | Dillon | A01D 41/02 460/114 |

(Continued)

FOREIGN PATENT DOCUMENTS

| | | |
|---|---|---|
| CA | 2274234 A1 | 12/2000 |
| CN | 106364856 A | 2/2017 |

(Continued)

OTHER PUBLICATIONS

Extended European Search Report for EP Application No. 19173109.0 dated Aug. 30, 2019 (14 pages).

*Primary Examiner* — Arpad Fabian-Kovacs
(74) *Attorney, Agent, or Firm* — Peter Zacharias; Patrick Sheldrake

(57) ABSTRACT

An unloading system for a harvester is described as including a crop delivery apparatus, an unloading structure, a belt, and a deflector. The crop delivery apparatus has an outlet through which a flow of crop material is expelled. The unloading structure receives the flow of crop material from the outlet of the crop delivery apparatus and includes a conveyor tube portion extending along a longitudinal axis and defining a passage therethrough with an open intake end. The belt extends into from the intake end through the passage for transporting the flow of crop material through the conveyor tube portion. The deflector extends within the unloading structure from an upstream end to a downstream end such that at least a portion of the flow of crop material received from the crop delivery apparatus contacts the deflector and is directed towards at least a portion of the belt.

20 Claims, 9 Drawing Sheets

(56) References Cited

U.S. PATENT DOCUMENTS

| | | |
|---|---|---|
| 8,997,445 B2 | 4/2015 | Koch et al. |
| 9,038,814 B2 | 5/2015 | Linde |
| 9,301,445 B1 | 4/2016 | Seeliger |
| 9,315,327 B2 | 4/2016 | Priepke |
| 2006/0002774 A1* | 1/2006 | Stumborg ............... B65G 53/08 406/57 |
| 2010/0266377 A1* | 10/2010 | Yoder ................ A01D 41/1217 414/519 |
| 2012/0269607 A1* | 10/2012 | Farley .................... B65G 33/14 414/507 |
| 2013/0087432 A1* | 4/2013 | Priepke .............. A01D 41/1217 198/716 |
| 2014/0066146 A1 | 3/2014 | Dilts et al. |
| 2014/0274236 A1 | 9/2014 | Priepke |
| 2015/0027854 A1* | 1/2015 | Priepke ................. B65G 15/08 198/617 |
| 2015/0366140 A1* | 12/2015 | Strnad ..................... A01F 12/46 460/114 |
| 2018/0042177 A1* | 2/2018 | Baert ....................... A01F 12/46 |
| 2018/0084727 A1 | 3/2018 | Andrios |
| 2019/0059220 A1* | 2/2019 | Matousek .......... A01D 41/1272 |

FOREIGN PATENT DOCUMENTS

| | | |
|---|---|---|
| JP | 2015/186447 | 3/2017 |
| WO | 2015013488 A1 | 1/2015 |

\* cited by examiner

SYSTEM FOR UNLOADING HARVESTED CROP FROM AN AGRICULTURAL HARVESTER

FIELD OF THE INVENTION

The present disclosure relates generally to agricultural harvesters and, more particularly, to systems for more efficiently and/or effectively unloading harvested crop from an agricultural harvester.

BACKGROUND OF THE INVENTION

A harvester is an agricultural machine used to harvest and process crops. For instance, a combine harvester may be used to harvest grain crops, such as wheat, oats, rye, barley, corn, soybeans, and flax or linseed. In general, the objective is to complete several processes within one pass of the machine over a field. In this regard, most harvesters are equipped with a detachable harvesting implement, such as a header, which cuts and collects the crop from the field. The harvester also includes a crop processing system, which performs various processing operations (e.g., threshing, separating, etc.) of the harvested crop received from the harvesting implement. Furthermore, the harvester includes a crop tank, which receives and stores the crop after processing.

In certain instances, the stored harvested crop is unloaded from the harvester into a nearby crop cart. More specifically, the harvester may include a crop unloading or discharge system, which conveys the harvested crop from the crop tank to a discharge location on the harvester. In some instance, the unloading system may unload the harvested crop at a greater rate than (e.g., at least double) the rate at which harvested crop enters the crop tank. As the capacity of agricultural harvesters increases, it is also desirable to increase the unload rate. For example, for larger capacity agricultural harvesters, it may be desired to have an unload rate of about 8 bushels per second. In this respect, to achieve such high unload rates, the crop unloading system must contain a small volume of the harvested crop conveyed at a high velocity or a large volume of the harvested crop conveyed at a low velocity.

A typical crop unloading system uses augers, particularly a vertical auger and a pivoting auger or a pivoting auger alone, to convey the harvested crop from the crop tank to the discharge location. However, the use of augers is highly inefficient, with the unloading capacity being around 4.5 bushels per second and the energy consumption exponentially increasing as the unload speed is increased. Further, the spacing between the auger and an unloading tube in which the auger is positioned can cause damage to the harvested crop.

Belt conveyors have been found to be an advantageous alternative to auger type conveyors, as belt conveyors are lighter, less costly, and may be operated at faster speeds than augers and therefore have a higher potential capacity. Also, belt conveyors can deliver harvested crop in a more continuous manner with less damage to the harvested crop than when augers are used. As a result, for some agricultural applications, it is desired to replace auger conveyors with belt conveyors. Particularly in applications wherein loading occurs while the harvester is moving, it is further advantageous to use covered conveyors such as belt-in-tube conveyors. In a belt-in-tube conveyor, the belt runs through an elongate tube, typically having a lower portion with a round or curved sectional shape, such that a portion of the belt traveling through the tube conforms to the lower portion such that the belt is imparted with an upwardly facing, typically curved, concave shape. The belt is usually gradually transitioned before or as the belt enters the tube in some manner from a flat shape towards the upwardly facing concave shape.

The belt-in-tube conveyors are typically fed from a crop tank wherein the only force acting on the harvested crop is gravity, such that the harvested crop moves generally downwardly. When the harvested crop is deposited on the belt moving horizontally or at an upward incline, the movement of the crop will have to be changed and the energy of such movement redirected. Also, some of the material will be lifted and shifted laterally towards the center of the belt when the belt is transitioned to the upwardly facing concave shape, potentially while more crop is being deposited onto the belt, such that turbulence can occur that impedes movement and acceleration of the crop, decreasing the effective capacity of the conveyor and conveying speed. Additionally, the belt's fill level is reduced as the speed of the belt increases and the incline of the conveyor increases. As such, a belt alone is ineffective at conveying the crop from the crop tank.

Thus, it has been found to be advantageous to use an elevator, such as a centrifugal discharge elevator, to lift harvested crop from a grain or crop tank and propel a substantial portion of the crop material generally in the direction of the conveyor tube so as to be at least partially deposited on the upwardly facing concave portion of the belt, where the belt-in-tube conveyor is generally horizontal or inclined upwardly at a small angle towards an outlet end. For example, such a combination of an elevator and a belt-in-tube conveyor is described in U.S. Pat. No. 9,371, 187 assigned to CNH Industrial America LLC, which is hereby incorporated by reference herein in its entirety for all purposes. As a result of the combination of the elevator and belt-in-tube conveyor, the crop material is not required to significantly change direction when deposited on the belt, as it is already moving at least largely in the feed direction of the belt entering the tube. As a result, the crop may be conveyed at a higher unload rate than the traditional configuration while consuming less energy than the traditional configuration. Further, the belt may already be substantially in the upwardly facing concave shape, such that little or no shifting of the crop material occurs, and contact of the crop material with a stationary part of the enclosing structure is avoided.

However, there are still issues that may arise with such a combination of an elevator and a belt-in-tube conveyor. For example, the grain might not enter the conveyor tube at all, causing a bottleneck at an inlet end of the tube. Alternatively, the harvested crop materials may be directed at an angle that causes the crop materials to get stuck between the tube and the belt, causing belt tracking and driving issues, especially when the crop has a higher moisture or oil content. Further, the crop delivery apparatus may fling the crop material in a swath with a width that is wider than the width of the belt, which may also cause tracking and driving issues.

Accordingly, an improved system for more efficiently and/or effectively unloading harvested crop materials from an agricultural harvester using a belt-in-tube conveyor would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to an unloading system for a harvester. The unloading system includes a crop delivery apparatus, an unloading structure, a belt, and a deflector. The crop delivery apparatus has an outlet portion through which a flow of crop material is expelled. The unloading structure receives the flow of crop material from the outlet portion of the crop delivery apparatus. The unloading structure has a conveyor tube portion extending along a longitudinal axis and defining a passage therethrough with an open intake end. The belt extends from the intake end through the passage for transporting the flow of crop material through the conveyor tube portion. The deflector extends within the unloading structure from an upstream end of the deflector to a downstream end of the deflector such that at least a portion of the flow of crop material received from the crop delivery apparatus contacts the deflector and is directed towards the belt.

In another embodiment, the present subject matter is directed to a harvester. The harvester may include a crop processing system for harvesting crops, a grain tank, an elevator assembly, an unloading structure, a belt, and a deflector. The grain tank receives harvested crop materials from the crop processing system. The elevator assembly receives the harvested crop materials from the grain tank. The elevator assembly has a housing with an outlet through which a flow of the harvested crop materials is expelled. The unloading structure receives the flow of crop materials from the elevator assembly. The unloading structure includes a conveyor tube portion extending along a longitudinal axis defining a passage therethrough having an open intake end. The belt extends from the intake end through the passage for transporting the harvested crop material through the conveyor tube portion. The deflector extends within the unloading structure from an upstream end of the deflector to a downstream end of the deflector such that at least a portion of the flow of harvested crop materials received from the elevator assembly contacts the deflector and is directed towards the belt.

In a further embodiment, the present subject matter is directed to an unloading system for an agricultural harvester. The unloading system may include a crop delivery apparatus, an unloading structure and a belt. The crop delivery apparatus has an outlet portion through which a flow of the crop material is expelled. The unloading structure receives the flow of crop material from the crop delivery apparatus. The unloading structure has a conveyor tube portion that extends along a longitudinal axis, the conveyor tube portion having an open intake end in communication with a passage through the conveyor tube portion. The belt has a first portion that extends into the passage through the intake end of the conveyor tube portion, wherein the first portion of the belt transports the flow of crop material through the conveyor tube portion. The crop delivery apparatus propels the flow of crop material through the outlet portion of the crop delivery apparatus such that at least a portion of the crop material is deposited onto the belt. The conveyor tube portion of the unloading structure is oriented such that a projection or extension of the longitudinal axis of the conveyor tube portion passes through the outlet portion of the crop delivery apparatus.

In still another embodiment, the present subject matter is directed to an unloading system for an agricultural harvester. The unloading system may include an elevator assembly, an unloading structure, and a belt. The elevator assembly has a housing with an outlet portion and an inner surface. The inner surface of the housing defines an outer flow boundary for a flow of crop material moving through the housing. The elevator assembly may also have crop material carriers that lift the flow of crop material within the housing towards the outlet portion. The crop material carriers move along a travel path within the housing around a head shaft of the elevator assembly. The unloading structure receives the flow of crop material from the elevator assembly. The unloading structure includes a conveyor tube portion that extends along a longitudinal axis and has an open intake end in communication with a passage through the conveyor tube portion. The belt has a first portion that extends into the intake end of the conveyor tube option to transport the flow of crop material through the conveyor tube portion. The elevator assembly propels the flow of crop material through the outlet portion of the elevator assembly such that at least part of the flow of crop material is deposited onto the belt. A point on the inner surface of the housing is generally adjacent an apex of the travel path of the crop material carriers within the elevator housing. The conveyor tube is positioned such that a center point at the intake end of the conveyor tube aligned with the longitudinal axis of the conveyor tube is disposed within about 10 degrees of a reference line extending tangent to the point on the inner surface of the housing of the elevator assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
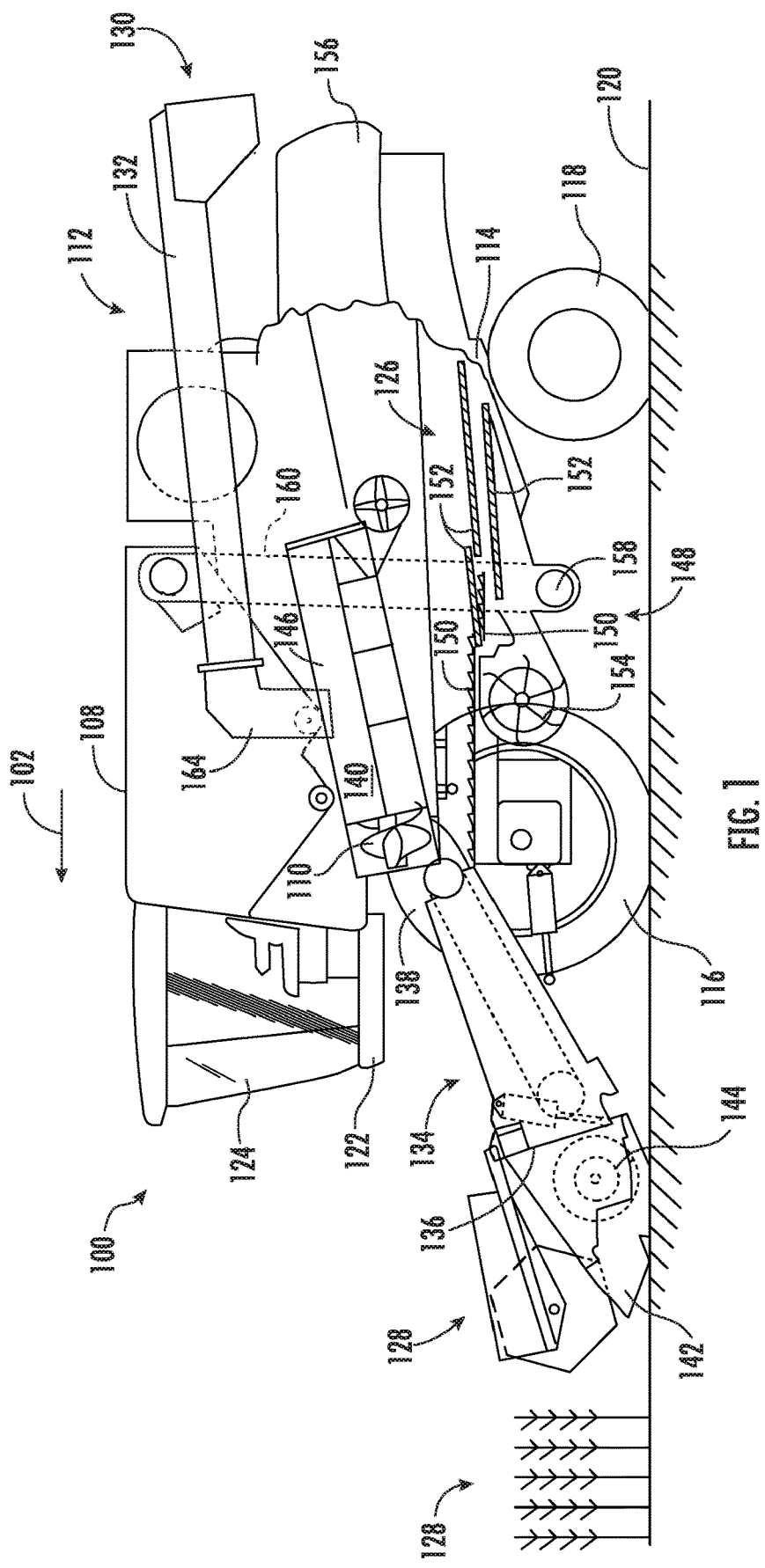
FIG. 1 illustrates a side view of one embodiment of an agricultural harvester in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved unloading system for an agricultural harvester. Specifically, in several embodiments, the unloading system may include a crop delivery apparatus for delivering crop material from an associated crop storage tank of the harvester to an unloading structure including a belt-in-tube conveyer, with the belt-in-tube conveyer being configured to transfer the crop material to a discharge point or location of the unloading structure for subsequent discharge into a crop cart or associated follower vehicle. As will be described below, in several embodiments, the specific positioning of the belt-in-tube conveyer relative to the crop delivery apparatus may allow for the crop material to be conveyed from the crop delivery apparatus to the discharge location in a very effective and efficient manner, thereby addressing many of the issues associated with prior art unloading systems. Moreover, in addition to such positioning of the belt-in-tube conveyer relative to the crop delivery apparatus (or as an alternative thereto), a crop deflector may be installed within the unloading structure to ensure that the crop material expelled from the crop delivery apparatus is properly delivered onto the conveyor belt, thereby addressing many of the issues associated with prior art unloading systems.

In one embodiment, the crop delivery apparatus may be configured as an elevator, such as a centrifugal discharge elevator. In such an embodiment, crop material carriers or paddles of the elevator may be configured to travel along an elliptical, substantially vertically oriented path between an upper shaft and a lower shaft of the elevator, thereby allowing crop material to be lifted from the crop storage tank of the harvester to an outlet of the elevator. The elevated crop material may then be propelled through the outlet of the elevator for receipt within a portion of the associated unloading structure of the disclosed unloading system. In several embodiments, the elevator may operate at a speed such that the crop material may travel with a velocity upwards of 15 meters per second (m/s), or from 5 m/s to 12 m/s, or from 6 m/s to 10 m/s through the outlet of the elevator, however, these ranges are not limiting.

In several embodiments, the unloading structure may include one or more tube portions for receiving the crop material discharged from the crop delivery apparatus. For instance, in one embodiment, the unloading structure may include both a transition tube portion and a conveyor tube portion coupled to or formed integrally with the transition tube portion, with the transition tube portion generally defining a transition passage through which the crop material discharged from the crop delivery apparatus flows prior to being received within the conveyer tube portion. In one embodiment, the conveyer tube portion may define a conveyer passage extending along a longitudinal axis that includes an open intake end positioned at the interface between the transition tube portion and the conveyer tube portion for receiving the crop material flowing through the transition passage.

Additionally, in accordance with aspects of the present subject matter, the unloading system may include a conveyor belt provided in operative association with the conveyer tube portion to form a belt-in-tube conveyor for transferring the crop material received within the conveyer tube portion to the discharge location of the unloading structure. In several embodiments, the belt may be configured to extend into the conveyor passage through the intake end of the conveyor tube portion such that at least a portion of the flow of crop material received from the crop delivery apparatus is deposited onto the belt and transported through the conveyor tube portion to the discharge location. In this regard, the combination of the crop delivery apparatus and the conveyor tube portion with the belt running therethrough provides an efficient unloading system, both in unloading volume speed and energy usage, as the crop material delivered on the belt continues to travel in the velocity range of the crop delivery apparatus. However, as indicated above, the relative positioning of such components is an important factor to consider when attempting to enhance the operating efficiency and/or effectiveness of the system. For example, without proper positioning of the belt-in-tube conveyer relative to the crop delivery apparatus, a bulk flow of the crop material may be subject to traveling in a helical path or "spiraling" within the unloading structure, which can lead to crop material getting in-between the belt and the conveyor tube portion of the unloading structure, thereby causing traction issues that can slow down or even stop the conveyor belt. Moreover, proper relative positioning between the belt-in-tube conveyer and the crop delivery apparatus helps to ensure that the crop material does not slow down in the feed direction of such material as the crop material transitions from the crop delivery apparatus to the conveyor belt.

To address such positioning-related issues and in accordance with aspects of the present subject matter, the conveyor tube portion of the unloading structure may, in one embodiment, be aligned with the crop delivery apparatus such that a projection or extension of the longitudinal axis of the conveyor tube portion passes through the outlet of the crop delivery apparatus. For example, the outlet of the crop delivery apparatus may have a cross-sectional area defined by a vertical height and a lateral width. In such an embodiment, a projection of the longitudinal axis of the conveyer tube portion may pass through the cross-sectional area defined by the vertical height and the lateral width of the outlet. Additionally, in a further embodiment, the projection of the longitudinal axis of the conveyor tube portion may be configured to pass through the cross-sectional area of the outlet of the crop delivery apparatus such that the projection of the longitudinal axis is substantially aligned with the upper shaft of the crop delivery apparatus, such as by passing through a predetermined angular range centered about the upper shaft of the crop delivery apparatus.

In addition to aligning the projection of the longitudinal axis of the conveyor tube portion with the cross-sectional area of the outlet (or as an alternative thereto), a center point of the conveyer tube portion defined along its longitudinal axis at the intake end of the conveyor tube portion may be disposed within a predetermined angular range of a reference tangent line extending tangent to a reference point defined relative to a portion of the housing of the crop delivery apparatus. Specifically, in several embodiments, the reference point may be defined on the inner surface of the housing of the crop delivery apparatus at a location generally adjacent to or directly vertically above the highest point of the elliptical path traveled by the crop material carriers around the upper shaft of the crop delivery apparatus. In one embodiment, the center point defined at the intake end of the conveyor tube portion may be disposed within an angular range of approximately 10 degrees of the reference tangent line extending from the reference point. In another embodiment, the center point defined at the intake end of the conveyor tube portion may be aligned directly with the reference tangent line extending from the reference point.

As indicated above, in addition to properly positioning the belt-in-tube conveyer relative to the crop delivery apparatus (or as an alternative thereto), the unloading system may also include a crop deflector installed within the unloading structure to address many of the issues associated with prior art unloading systems. For example, to increase the capacity of the unloading system while running the crop delivery apparatus at a reasonable speed, it is often desirable for the carriers of the crop delivery apparatus to be wider than the width of the belt. As such, the flow of crop material exiting the crop delivery apparatus through the outlet tends to be propelled outwardly in a fan or swath that is wider than the width of the belt. In such an embodiment, by installing a deflector within the unloading structure, the deflector may be capable of redirecting the flow of crop material exiting the crop delivery apparatus towards the conveyor belt, thereby preventing crop material from getting in-between the conveyor tube portion and the conveyor belt. For example, the deflector may be configured to divert the flow of crop material towards the center of the conveyor belt, thereby avoiding any traction issues and maintaining the overall efficiency of the system.

In several embodiments, an outer side of the deflector may be shaped to match the surface to which it is coupled (e.g., the inner surface of the portion of the transition tube portion and/or the conveyer tube portion to which it is coupled), while at least a portion of an inner surface of the deflector may be configured to have a radially inwardly converging contour that is shaped to converge the fanned-out flow of crop material in the direction of the center of the belt. In one embodiment, the radially inwardly converging contour of the inner surface may extend along at least half of a length of the deflector defined between opposed first and second ends of the deflector and may be at least partially cone-shaped. For example, in one embodiment, the base or enlarged end of the cone-shaped contour may be disposed at the first or upstream end of the deflector and the point or converged end of the cone-shaped contour may be disposed at a location defined between the first and second ends of the deflector. The contour may be designed such that crop material contacting the deflector is not substantially slowed down to further protect the efficiency of the system by preventing bottlenecking.

Additionally, in several embodiments, the deflector may be configured to be installed within the conveyor tube portion of the unloading structure. For example, in one embodiment, the first or upstream end of the deflector may be aligned or coincident with the intake end of the conveyor tube portion such that the deflector extends from the intake end within the interior of the conveyor tube portion. In such an embodiment, the outer side of the deflector may be configured to match the contour or shape of an upper half or section of the conveyor tube portion such that the first end of the deflector may be positioned at the intake end of the conveyor tube portion. However, in other embodiments, the deflector may be positioned at any other suitable location within the unloading structure, such as being installed entirely within the transition tube portion of the unloading structure or by being installed within the unloading structure such that an upstream portion of the deflector is positioned within the transition tube portion and a downstream portion of the deflector is positioned within the conveyer tube portion.

Referring now to the drawings, FIG. 1 illustrates a partial sectional side view of an agricultural harvester 100, particularly illustrating various components of the harvester 100. In general, the harvester 100 may be configured to move across a field in a direction of travel (e.g., as indicated by arrow 102) to harvest a standing crop 104. While traversing the field, the harvester 100 may be configured to process the harvested grain or crop material 106 (FIG. 2) and store the crop material 106 within a grain or crop storage tank 108 of the harvester 100. In one embodiment, the harvester 100 may be configured as an axial-flow type combine, wherein the harvested crop material 106 is threshed and separated while the crop material 106 is advanced by and along a longitudinally arranged rotor 110. However, it should be appreciated that, in alternative embodiments, the harvester 100 may have any suitable harvester configuration. Further, in accordance with aspects of the present subject matter, the harvester 100 may be configured to unload the harvested crop material 106 stored within the crop storage tank 108 via an unloading system 112 of the harvester 100. For example, the unloading system 112 may be used to transfer the harvested crop material 106 from the crop storage tank 108 to an associated cart or follower vehicle that is moving alongside the harvester 100 during the harvesting operation.

As shown in FIG. 1, the harvester 100 may include a chassis or main frame 114 configured to support and/or couple to various components of the harvester 100. For example, in several embodiments, the harvester 100 may include a pair of driven, ground-engaging front wheels 116 and a pair of steerable rear wheels 118 that are coupled to the frame 114. As such, the wheels 116, 118 may be configured to support the harvester 100 relative to a ground surface 120 and move the harvester 100 in the forward direction of travel 102 relative to the ground surface 120. Furthermore, the harvester 100 may include an operator's platform 122 having an operator's cab 124, a crop processing system 126, all of which may be supported by the frame 114. As will be described below, the crop processing system 126 may be configured to perform various processing operations on the harvested crop material 106 as the crop processing system 126 operates to transfer the crop material 106 between a harvesting implement (e.g., header 128) of the harvester 100 and the crop storage tank 108. Furthermore, as indicated above, the unloading system 112 may be configured to convey the harvested crop material 106 from the crop storage tank 108 to an associated discharge location 130 on the harvester 100, such as a location on or adjacent to a discharge end of corresponding unloading structure 132 of the unloading system 112. Additionally, as is generally understood, the harvester 100 may include an engine and a transmission mounted on the frame 114. The transmission may be operably coupled to the engine and may provide variably adjusted gear ratios for transferring engine power to the wheels 116, 118 via a drive axle assembly (or via axles if multiple drive axles are employed).

Moreover, as shown in FIG. 1, the header 128 and an associated feeder 134 of the crop processing system 126 may extend forward of the frame 114 and may be pivotally secured thereto for generally vertical movement. In general, the feeder 134 may be configured to serve as support structure for the header 128. For example, the feeder 134 may extend between a front end 136 coupled to the header 128 and a rear end 138 positioned adjacent to a threshing and separating assembly 140 of the crop processing system 126. As is generally understood, the rear end 138 of the feeder 134 may be pivotally coupled to a portion of the harvester 100 to allow the front end 136 of the feeder 134 and, thus the header 128, to be moved upward and downward relative to the ground 120 to set the desired harvesting or cutting height for the header 128.

As the harvester 100 is propelled forwardly over the field with the standing crop 104, the crop material 106 is severed from the standing crop by a sickle bar 142 at the front of the header 128 and delivered by a header auger 144 to the front end 136 of the feeder 134, which supplies the harvested crop material 106 to the threshing and separating assembly 140. As is generally understood, the threshing and separating assembly 140 may include a cylindrical chamber 146 in which the rotor 110 is rotated to thresh and separate the harvested crop material 106 received therein. That is, the harvested crop material 106 is rubbed and beaten between the rotor 110 and the inner surfaces of the chamber 146, whereby the grain, seed, or the like, is loosened and separated from the straw.

The harvested crop material 106 that has been separated by the threshing and separating assembly 140 may fall onto a crop cleaning assembly 148 of the crop processing system 126. In general, the crop cleaning assembly 148 may include a series of pans 150 and associated sieves 152. As is generally understood, the separated crop material 106 may be spread out via oscillation of the pans 150 and/or sieves 152 and may eventually fall through apertures defined in the sieves 152. Additionally, a cleaning fan 154 may be positioned adjacent to one or more of the sieves 152 to provide an air flow through the sieves 152 that removes chaff and other impurities from the crop material 106. For instance, the fan 154 may blow the impurities off of the crop material 106 for discharge from the harvester 100 through the outlet of a straw hood 156 positioned at the back end of the harvester 100. The cleaned crop material 106 passing through the sieves 152 may then fall into a trough of an auger 158, which may be configured to transfer the harvested crop 106 to an elevator assembly 160 for delivery to the crop storage tank 108. The crop material 106 contained within the crop storage tank 108 may then be delivered to the inlet of the unloading system 112 via one or more cross-augers 162 positioned at the bottom of the tank 108.

Figure 2:
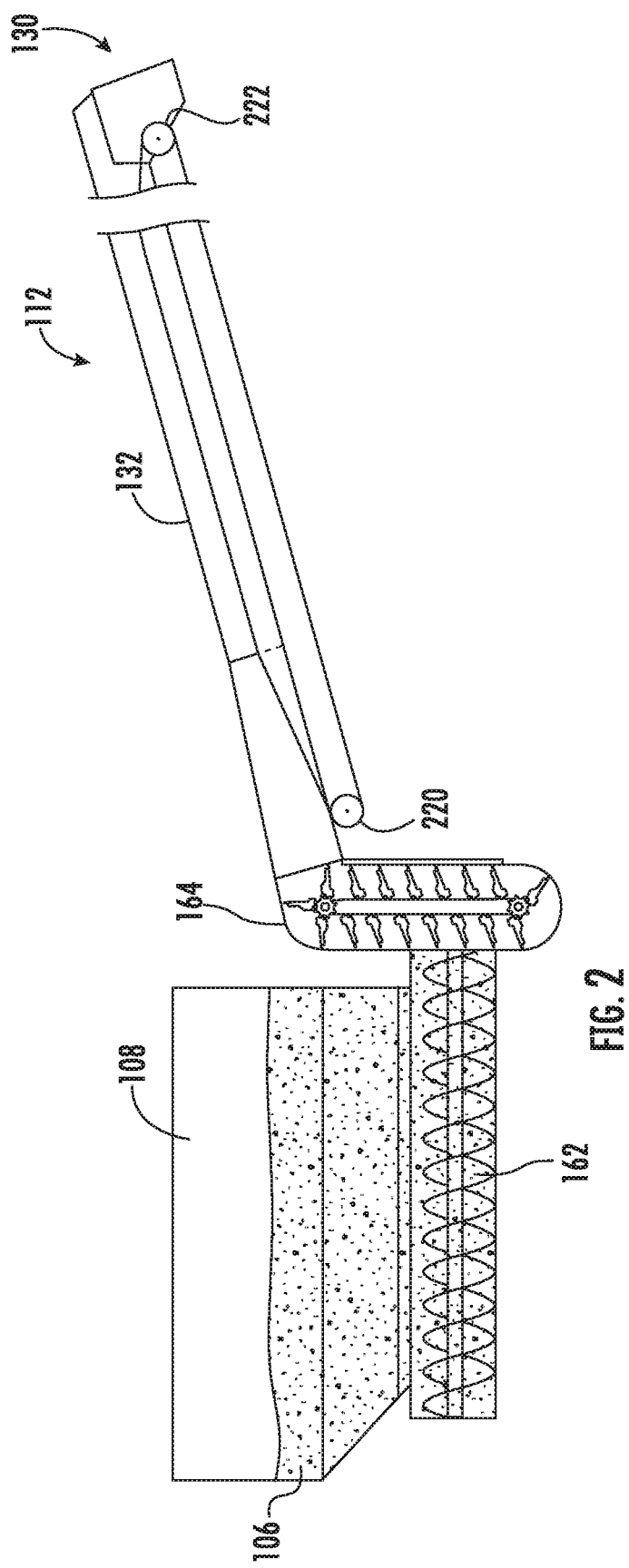
FIG. 2 illustrates a side schematic view of one embodiment of an unloading system suitable for use with the agricultural harvester shown in FIG. 1 in accordance with aspects of the present subject matter, particularly illustrating a crop delivery apparatus for delivering crop from a crop tank to an associated belt-in-tube conveyor of the unloading system.
Figure 3:
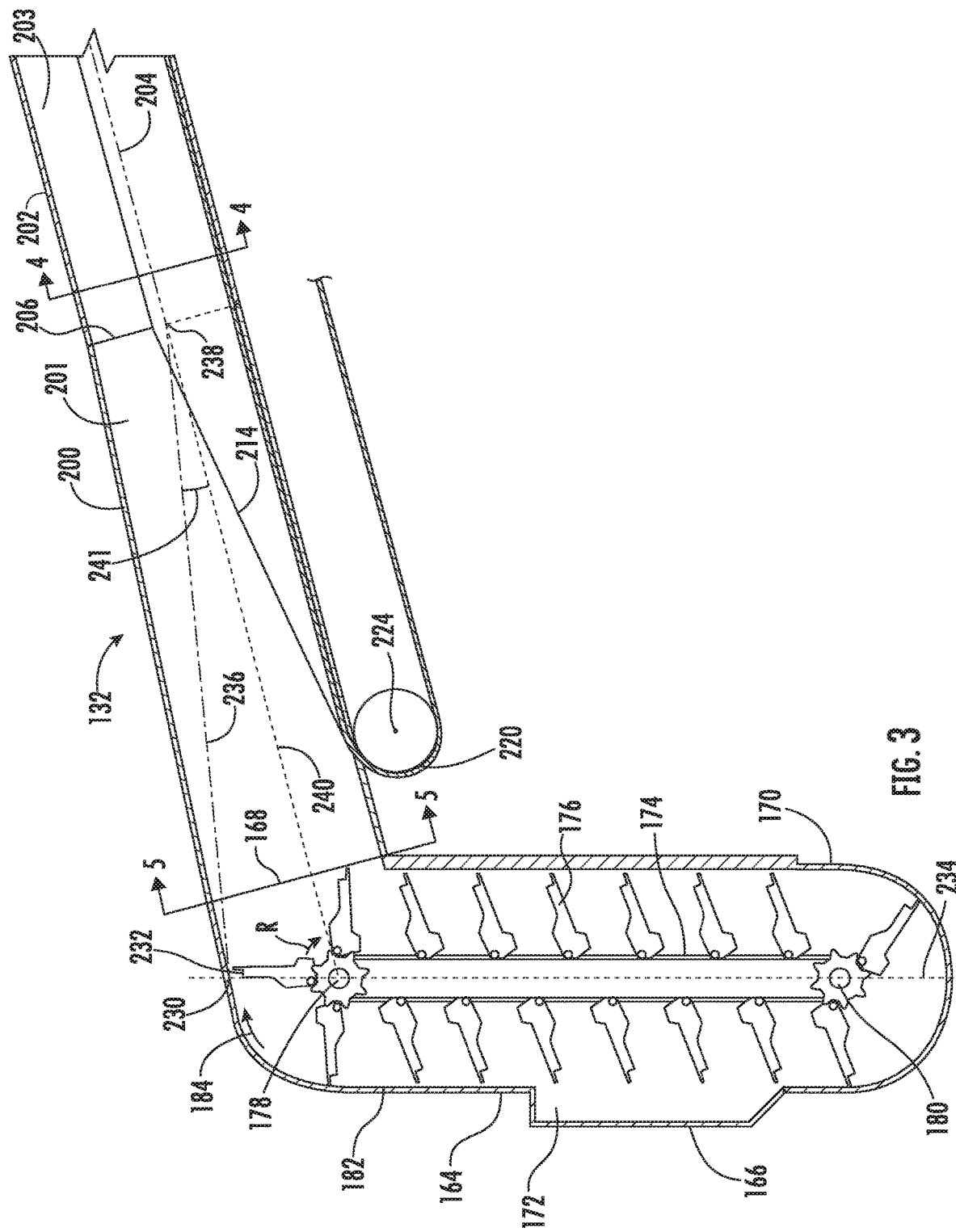
FIG. 3 illustrates a side, cross-sectional view of a portion of the embodiment of the unloading system shown in FIG. 2 in accordance with aspects of the present subject matter, particularly illustrating aspects of the crop delivery apparatus and the belt-in-tube conveyor of the unloading system.
Figure 4:
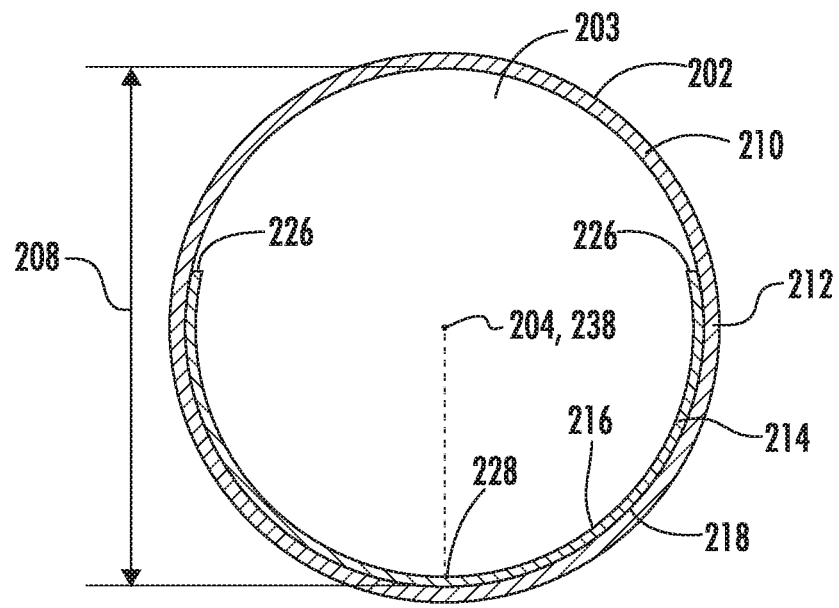
FIG. 4 illustrates a cross-sectional view of a conveyor tube portion of the unloading system shown in FIG. 3 taken about line 4-4.
Figure 5:
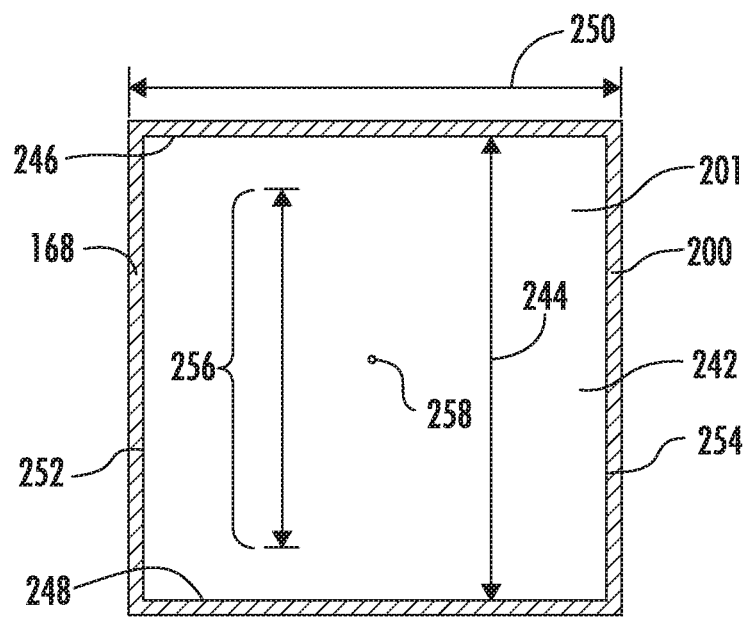
FIG. 5 illustrates a cross-sectional view of an outlet end of the crop delivery apparatus of the unloading system shown in FIG. 3 taken about line 5-5.

Referring now to FIGS. 2-5, various views of one embodiment of the unloading system 112 described above is illustrated in accordance with aspects of the present disclosure. Specifically, FIGS. 2 and 3 illustrate side sectional views of various components of the unloading system 112 and FIGS. 4 and 5 illustrate cross-sectional views of the portion of the unloading system 112 shown in FIG. 4 taken about lines 4-4 and 5-5, respectively.

As particularly shown in FIGS. 2 and 3, the unloading system 112 may generally include both a crop delivery apparatus 164 and an unloading structure 132 for transferring crop material 106 from the crop storage tank 108 to the discharge location 130 of the unloading system 112 for subsequent delivery to a crop cart or other storage vehicle. In general, the crop delivery apparatus 164 may be configured to receive crop material 106 from the associated crop storage tank 108. For example, the cross-auger(s) 162 positioned at the bottom of the crop storage tank 108 may be configured to direct the crop material 106 contained within the tank 108 towards an inlet 166 of the crop delivery apparatus 164. Upon receipt of the crop material 106 from the storage tank 108, the crop delivery apparatus 164 may be configured to transport the crop material 106 (e.g., along a substantially vertical path) from the inlet 166 to an outlet 168 of the crop delivery apparatus 164, at which point the crop material 106 may be transferred into the unloading structure 132. As will be described below, the unloading structure 132 may be configured, at least in part, as a belt-in-tube conveyer. As such, the crop material 106 discharged from the crop delivery apparatus 164 via the outlet 168 may be directed on the conveyer belt along at least a portion of the length of the unloading structure 132 (e.g., along a horizontal path or a slightly upwardly angled path) for subsequent delivery to the discharge location 130.

As particularly shown in FIG. 3, in several embodiments, the crop delivery apparatus 164 may be configured as an elevator, such as a centrifugal discharge elevator. In such an embodiment, the crop delivery apparatus 164 may include an outer elevator housing 170 defining both the inlet 166 and the outlet 168 of the crop delivery apparatus 164. In general, the inlet 166 may be disposed at or adjacent to a lower portion of the elevator housing 170 to allow the crop delivery apparatus 164 to receive crop material 106 from the crop storage tank 108 via the operation of the cross auger(s) 162. Similarly, the outlet 168 may be disposed at or adjacent to an upper portion of the elevator housing 170 such that the flow of crop material 106 transferred through the housing 170 may be expelled from the crop delivery apparatus 164 into the adjacent unloading structure 132 of the unloading system 112.

Additionally, as particularly shown in FIG. 3, the crop delivery apparatus 164 may include an elevator assembly 172 extending within the housing 170 between the inlet and outlet 166, 168. In general, the elevator assembly 172 may include a looped chain 174 and a plurality of crop material carriers 176 (hereinafter referred to as "carriers 176") coupled to and evenly spaced apart on the looped chain 174. The chain 174 may generally be configured to move the carriers 176 within the housing 170 along a looped travel path between the inlet and outlet 166, 168, thereby allowing the carriers 176 to collect crop material 106 at the inlet 166 of the housing 170 and transport such crop material 106 to the outlet 168 of the housing 170. Additionally, the elevator assembly 172 may include an upper shaft 178 (and an associated upper sprocket) positioned at the upper end of the looped travel path of the carriers 176 and a lower shaft 180 (and an associated lower sprocket) positioned at the lower end of the looped travel path of the carriers 176. An elevator motor (not shown) may be coupled to one of the shafts 178, 180 (e.g., the upper shaft 178) such that the associated sprocket drives the chain 174, thereby allowing the chain 174 and carriers 176 to travel in an endless loop within the housing 170. As particularly shown in FIG. 3, the upper shaft 178 may generally define a rotational axis R about which the carriers 176 are rotated as the carriers 176 loop around the associated upper sprocket to allow the crop material 106 being transported thereby to be discharged from the crop delivery apparatus 164. For example, in several embodiments, the carriers 176 may be configured to fling or propel the crop material 106 into the unloading structure 132 as the carriers 176 are looped around the upper shaft 178/sprocket about the rotational axis R. For instance, in one embodiment, the carriers 176 may be configured to fling or propel the crop material 106 through the outlet 168 at a velocity ranging from about 10 m/s to about 20 m/s, such as a velocity at around 15 m/s.

It should be appreciated that the carriers 176 may correspond to buckets, paddles, or any other structure suitable for lifting the crop material 106 within the housing 170 of the crop delivery apparatus 164 and for propelling the flow of crop material 106 through the outlet 168 into the unloading structure 132. It should also be appreciated that an inner surface 182 of the housing 170 may generally define an outer flow boundary 184 for the crop material 106 being transported through the crop delivery apparatus 47. For instance, as the crop material 106 is elevated from the inlet 166 of the housing 170 towards the outlet 168 of the housing 170, the outer ends of the carriers 176 may be moved upwardly within the housing generally adjacent to the inner surface 182 of the housing 170. As such, the inner surface 182 of the housing 170 may define the outermost boundary 184 for the flow of crop material 106 through the crop delivery apparatus 164.

Moreover, as shown in FIGS. 2 and 3, the unloading structure 132 may generally be configured as a discharge tube or similar structure and, thus, may include one or more tube-shaped portions defining an internal passage(s) for transporting the crop material 106 between the crop delivery apparatus 164 and the discharge location 130 of the unloading system 112. For example, in several embodiments, the unloading structure 132 may include both a transition tube portion 200 and a conveyor tube portion 202. As particularly shown in FIG. 3, the transition tube portion 200 may generally be configured to extend lengthwise between the outlet 168 of the crop delivery apparatus 164 and the conveyor tube portion 202 and may define a transition passage 201 along its length through which the crop material 106 is propelled as it exits the outlet 168 of the crop delivery apparatus 164. In several embodiments, the transition passage 201 defined by the transition tube portion 200 may be configured to "transition" in shape from the shape of the outlet 168 of the crop delivery apparatus 164 to the shape of the downstream conveyer tube portion 202. For example, as will be described below, in one embodiment, the outlet 168 of the crop delivery apparatus 164 may define a rectangular or rectilinear cross-sectional shape whereas the conveyer tube portion 202 may define a circular cross-sectional shape. In such an embodiment, the transition passage 201 may be configured to transition from a rectangular or rectilinear cross-sectional shape to a circular cross-sectional shape as it extends from the crop delivery apparatus 164 to the conveyer tube portion 202.

Additionally, as shown in FIGS. 2 and 3, the conveyor tube portion 202 of the unloading structure 132 may generally be configured to define a conveyor passage 203 extending lengthwise along a longitudinal axis 204 between the transition tube portion 200 and the discharge location 130 of the unloading system 112. As particularly shown in FIG. 3, the conveyor passage 203 defined by the conveyer tube portion 202 may include an open intake end 206 defined at the interface between the transition tube portion 200 and the conveyer tube portion 202. In several embodiments, the conveyor tube portion 202 may define a generally constant inner diameter 208 along its length. Additionally, as particularly shown in FIG. 4, the longitudinal axis 204 of the conveyor tube portion 202 may, in several embodiments, pass directly through the geometric center of the circular-shaped conveyor passage 203. As shown in FIG. 4, given its circular cross-sectional shape, the conveyor tube portion 202 may further include both an upper half or section 210 having a downwardly opening concave shape and a lower half or section 212 having an upwardly opening concave shape.

Additionally, as shown in FIGS. 3 and 4, the unloading system 112 may also include an endless conveyor belt 214 extending at least partially within the unloading structure 132 that defines an upper surface 216 for supporting crop material 106 as it conveys the crop material 106 through the unloading structure 132 to the discharge end 130 of the unloading system 112. The belt 214 also defines a lower surface 218 opposite the upper surface 216 that rides along and contacts the lower section 212 of the conveyor tube portion 202. The endless conveyer belt 214 (hereinafter referred to simply as the "belt 214" or the "conveyer belt 214") may generally be configured to extend in an endless loop between an upstream end 220 located generally adjacent to the transition tube portion 200 and a downstream end 222 located generally adjacent to the discharge end 130 of the unloading structure 132. As particularly shown in FIG. 3, a drive shaft or other drive member 224 may be positioned at the upstream end 220 of the belt 214 to rotationally drive the belt 214 along its endless loop. As shown in FIGS. 2 and 3, the belt 214 may have a generally flat profile at is extends from its downstream end 222 to its upstream end 220 along the exterior of the unloading structure 132. However, upon wrapping around the drive member 224 at the upstream end 220 of the belt 214, the belt 214 may be configured to transition to a more upwardly concave shape as it extends between the drive shaft 224 and the open intake end 206 of the conveyor tube portion 202. Once at the open intake end 206, the belt 214 may be configured to conform to and be in contact with or positioned directly adjacent to the lower section 212 of the conveyor tube portion 202 such that it is concave and defines an upwardly opening, generally semi-circular shape as it extends from the open intake end 206 to the downstream end 222 of the belt 214. As particularly shown in FIG. 4, as the belt 214 takes on its semi-circular shape as it is traversed through the conveyer tube portion 202, the belt 214 may have upwardly facing edges 226 that extend vertically above the longitudinal axis 204 of the conveyor tube portion 202. In one embodiment, a center line 228 of the belt 214 is positioned vertically below the longitudinal axis 204 of the conveyor tube portion 202 such that the upwardly facing edges 226 extend equally vertically from the longitudinal axis 204. Such positioning of the center line 228 maximizes the crop material 106 carrying capacity of the belt 214. For example, if an edge of the upwardly facing edges 226 extends vertically below the other edge of the upwardly facing edges 226, the lower edge denotes a maximum fill level of the crop material 106 on the belt 214 before the crop material 106 begins to ride along the top of the lower edge. If the crop material 106 extends above the maximum fill level, the chance of the crop material 106 getting in-between the lower surface 218 of the belt 214 and the lower section 212 of the conveyor tube portion 202 and causing traction issues increases.

As indicated above, in several embodiments, it may be desirable to properly position the belt-in-tube conveyer 202 relative to the crop delivery apparatus 164 to ensure effective and efficient operation of the unloading system 112. Generally, the relative positioning of such components is a function of various parameters, including, but not limited to, the desired elevator speed, the shape of the elevator housing 170 around the upper shaft 178 of the elevator 172, the distance between the upper shaft 178 of the elevator 172 and the conveyor tube portion 202, and the shape and inclination of the carriers 176 of the elevator 172.

In one embodiment, to establish the relative positioning between the belt-in-tube conveyer 202 and the crop delivery apparatus 164, a given reference point defined at the intake end 206 of the conveyor tube portion 202 may be configured to be aligned or substantially aligned with a corresponding reference line extending from an associated reference point defined on or within the crop delivery apparatus 164. For example, as shown in FIG. 3, a reference point 230 may be defined along the inner surface 182 of the elevator housing 170 at a location that is generally adjacent to an apex 232 or highest point of travel of the outer ends of the carriers 176 along the elliptical-shaped travel path of the carriers 176. Specifically, as shown in the illustrated embodiment, the reference point 230 is further defined at the intersection of the inner surface 182 of the housing 170 and a common axis line 234 that extends orthogonally through both the lower shaft 180 and the upper shaft 178 of the crop delivery apparatus 164.

As shown in FIG. 3, to position the conveyer tube portion 202 (and the associated conveyer belt 214 extending therein) relative to the crop delivery apparatus 164, a tangential reference line 236 may be defined that extends tangent to the inner surface 182 of the housing 170 at the reference point 230. In such an embodiment, a center point 238 of the conveyor tube portion 202 defined at its intake end 206 may be aligned or substantially aligned with the tangential reference line 236. As used herein, the center point 238 of the conveyer tube portion 202 at its intake end 206 is "aligned" with the tangential reference line 236 when the reference line 236 passes directly through the center point 238 (e.g., as shown in the embodiment of FIG. 3). Similarly, as used herein, the center point 238 of the conveyer tube portion 202 at its intake end 206 is "substantially aligned" with the tangential reference line 236 when the reference line 236 passes directly through the center point 238 or passes above or below the center point 238 within an angular range of plus or minus (+/−) 10 degrees, such as within an angular range of +/−5 degrees or within an angular range of +/−2.5 degrees or within an angular range of +/−1 degree.

In the illustrated embodiment, the inner surface 182 of the housing 170 generally transitions from a radial or curved profile to a substantially straight profile at a location generally aligned with the common axis line 234 (e.g., at the location of the reference point 230 defined in FIG. 3). However, in other embodiments, the inner surface 182 of the housing 170 may be configured to transition from the radial or curved profile to the substantially straight profile at a location forward or aft of the common axis line 234. In such an embodiment, as opposed to being aligned with the common axis line 234, the reference point 230 may, for example, be defined at the location of the transition between the radial/curved profile and the substantially straight profile of the inner surface 182 of the housing 170, with the tangential reference line 236 extending tangent from the reference point 230 defined at such transition location.

In addition to aligning the center point 238 of the conveyor tube portion 202 at its intake end 206 relative to a tangential reference line 236 extending from the associated reference point 230 defined along the inner surface 182 of the elevator housing 170 (or as an alternative thereto), the conveyer tube portion 202 may be oriented relative to the crop delivery apparatus 164 such that the longitudinal axis 204 of the conveyer tube portion 204 is aligned with the outlet 168 of the crop delivery apparatus 164. Specifically, as shown in FIG. 3, an extension or projection 240 of the longitudinal axis 204 of the conveyor tube portion 202 may be referenced that extends parallel to and is coincident with the longitudinal axis 204. In such an embodiment, the conveyor tube portion 202 may be oriented relative to the crop delivery apparatus 164 such that the projection 240 of the longitudinal axis 204 passes through an internal cross-sectional area 242 (FIG. 5) defined by the outlet 168 of the crop delivery apparatus 164. For example, as shown in FIG. 5, the outlet 168 of the crop delivery apparatus 164 may have a rectangular shape defining an internal cross-sectional area 242 that extends along a vertical height 244 defined between a top end 246 and a bottom end 248 of the outlet 168 and also along a horizontal width 250 defined between a first side 252 and a second side 254 of the outlet 168. In such an embodiment, the projection 240 of the longitudinal axis 204 of the conveyer tube portion 202 may be configured to pass through the outlet 168 of the crop delivery apparatus 164 at a location along vertical height 244 defined between its top and bottom ends 246, 248. For example, in a particular embodiment, the projection 240 of the longitudinal axis 204 of the conveyer tube portion 202 may be configured to pass through a vertical height range 256 that is centered at a geometric center 258 of the outlet 168 and that corresponds to a vertical range that is smaller than the vertical height 244 of the internal cross-sectional area 242. For instance, in one embodiment, the vertical height range 256 may be equal to less than 50% of the vertical height 244 of the internal cross-sectional area 242, less than 25% of the vertical height 244, or less than 15% of the vertical height 244, or less than 10% of the vertical height 244, or less than 5% of the vertical height 244.

Additionally, in one embodiment, the projection 240 of the longitudinal axis 204 of the conveyor tube portion 202 may also be configured to be aligned or substantially aligned with the rotational axis R of the upper shaft 178 of the crop delivery apparatus 164. As used herein, the projection 240 of the longitudinal axis 204 is "aligned" with the rotational axis R of the upper shaft 178 when the projection 240 passes directly through the rotational axis R (e.g., as shown in the embodiment of FIG. 3). Similarly, as used herein, the projection 240 of the longitudinal axis 204 is "substantially aligned" with the rotational axis R of the upper shaft 178 when the projection 240 passes directly through the rotational axis R or passes above or below the rotational axis R within an angular range of plus or minus (+/−) 10 degrees, such as within an angular range of +/−5 degrees or within an angular range of +/−2.5 degrees or within an angular range of +/−1 degree.

It should be appreciated that, although the outlet 168 of the crop delivery apparatus 164 is shown in FIG. 5 as having a rectangular cross-sectional shape, the outlet 168 may be configured to define any other suitable cross-sectional shape, such as a circular shape, an elliptical shape, any polygonal shape, and/or the like.

It should also be appreciated that, as opposed to defining the reference line 236 as extending tangent from the associated reference point 230, the reference line 236 may, instead, be defined relative to the projection 240 of the longitudinal axis 204 of the conveyor tube portion 202. For example, in several embodiments, the reference line 236 may be oriented at an acute angle 241 relative to the projection 240 (e.g., as referenced from the center point 238 of the conveyor tube portion 202 at its intake end 206). In one embodiment, the angle 241 defined between the projection 240 of the longitudinal axis 204 of the conveyor tube portion 202 and the reference line 236 may correspond to an angle ranging from 0 degrees to 40 degrees, such as an angle ranging from 5 degrees to 35 degrees, or from 5 degrees to 25 degrees or from 10 degrees to 20 degrees and/or any other subranges therebetween.

Additionally, it should be appreciated that, by positioning the belt-in-tube conveyer relative 202 to the crop delivery apparatus 164 in accordance with one or more of the embodiments described herein, a majority of the flow of crop material 106 expelled from the outlet 168 of the crop delivery apparatus 164 may be deposited onto the belt 214 at a location at or downstream of the intake end 206 of the conveyer tube portion 202, without causing bottlenecking of the flow of crop material 106 at the intake end 206 of the conveyor tube portion 202 or causing the flow of crop material 106 to travel in a helical path within the conveyor tube portion 202. As a result, the crop material 106 may be conveyed between the crop delivery apparatus 164 and the discharge location 130 of the unloading system 112 without the need to accelerate the crop material 106 on the conveyer belt 214 while preventing the level or height of the crop material 106 within the conveyer tube portion 202 from exceeding the sides or upwardly facing edges 226 of the conveyer belt 214. The crop material 106 may also be conveyed from the grain tank 108 to the discharge location 130 at almost double the unload rate of prior art systems and may also use less energy than the prior art systems operated at the lower unload rate.

Figure 6:
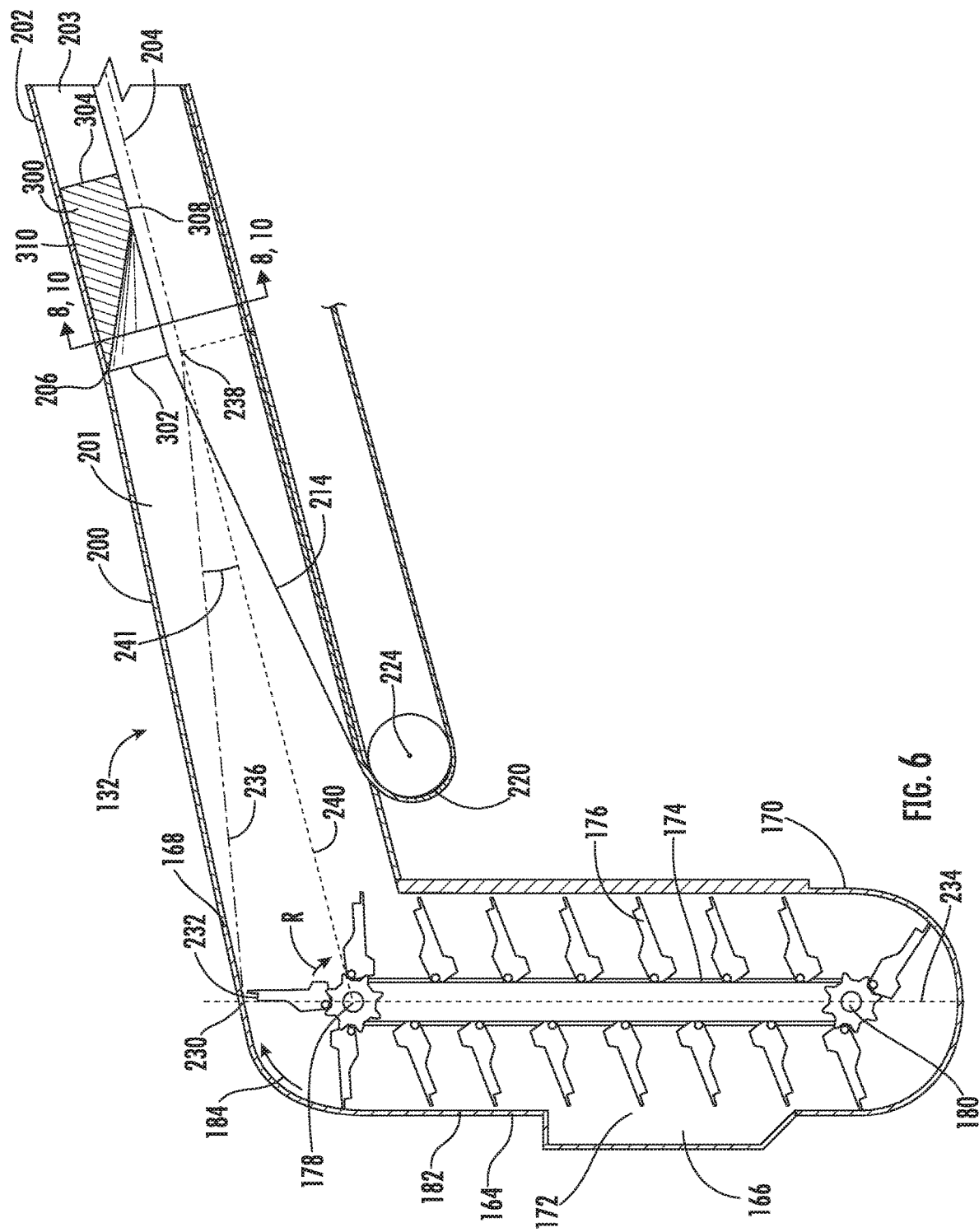
FIG. 6 illustrates a side, cross-sectional view of another embodiment of an unloading system suitable for use with the agricultural harvester shown in FIG. 1 in accordance with aspects of the present subject matter, particularly illustrating a crop deflector positioned within the conveyor tube portion of the unloading system for deflecting crop towards the associated belt-in-tube conveyor.
Figure 7:
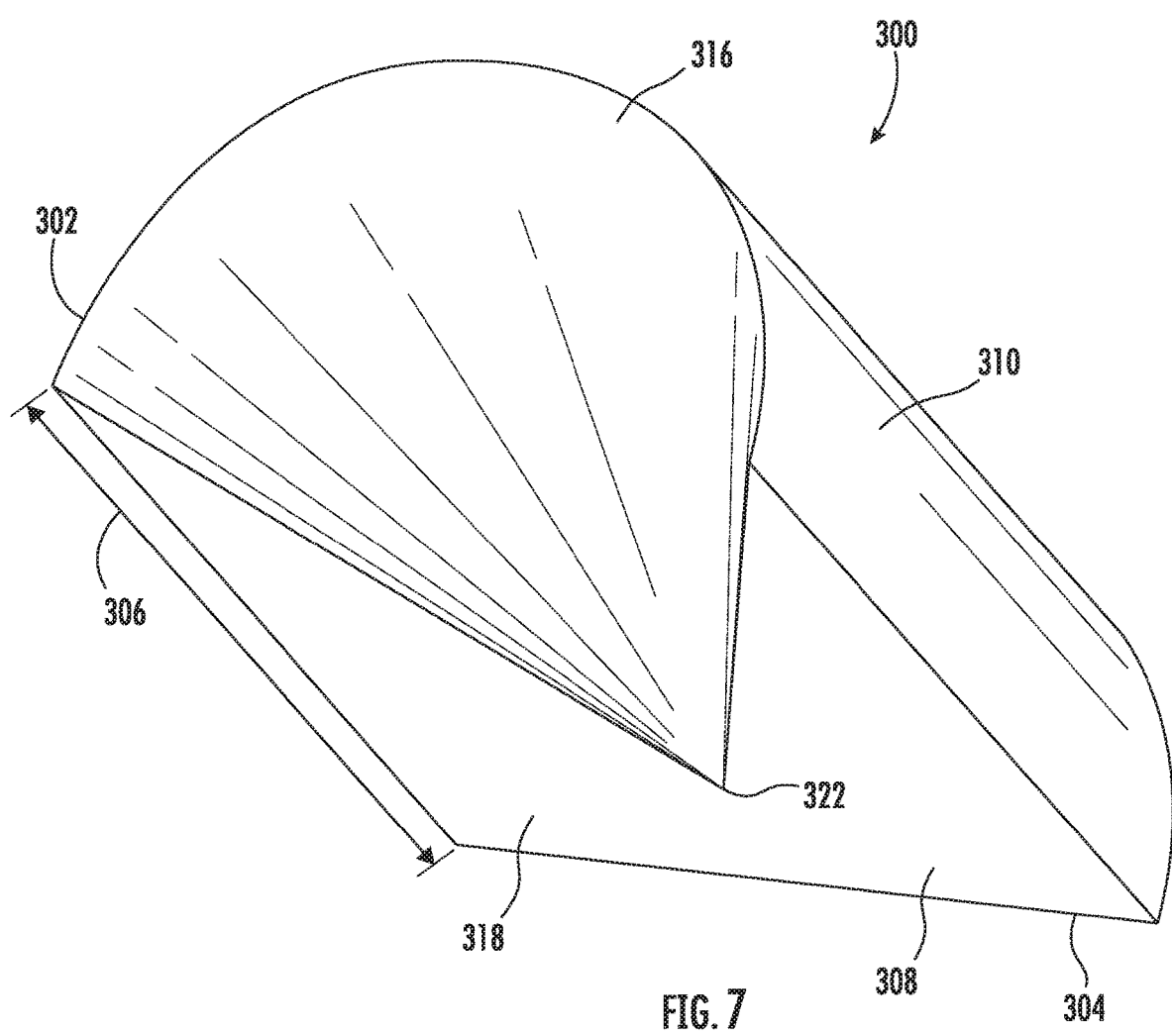
FIG. 7 illustrates a perspective view of one embodiment of a deflector suitable for use with the unloading system shown in FIG. 6 in accordance with aspects of the present subject matter.
Figure 8:
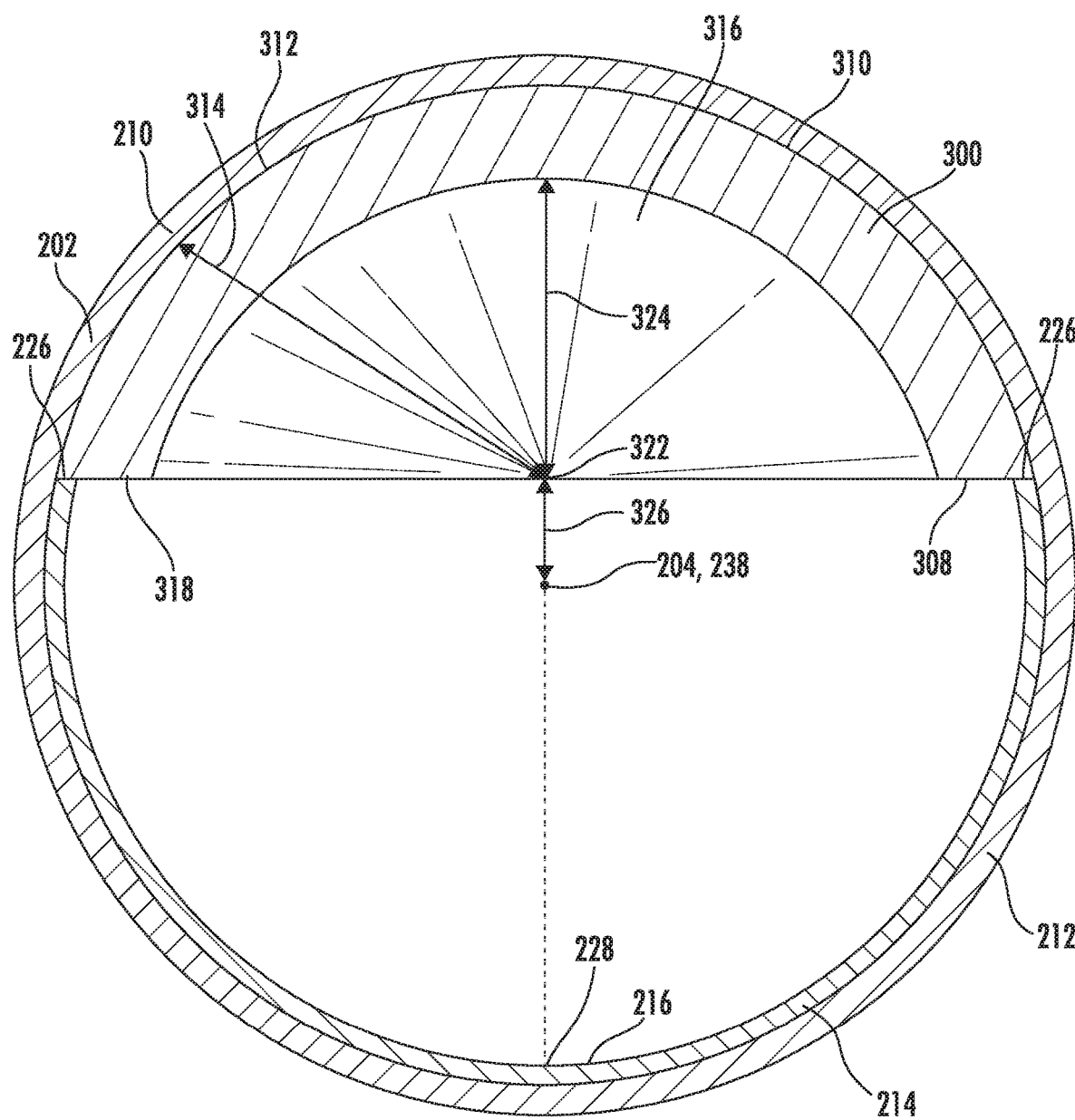
FIG. 8 illustrates a cross-sectional view of the conveyor tube portion of the unloading system shown in FIG. 6 taken about line 8,10-8,10, particularly illustrating the embodiment of the deflector shown in FIG. 7 installed within the conveyor tube portion in accordance with aspects of the present subject matter.

Referring now to FIGS. 6-8, several views of another embodiment of the unloading system described above are illustrated in accordance with aspects of the present subject matter. Specifically, FIG. 6 illustrates a sectional view of the various components of the unloading system 112 described above with reference to FIG. 3, with a crop deflector 300 being installed within the unloading structure 132 of the system 112 in accordance with aspects of the present subject matter. FIG. 7 illustrates a side perspective view of the crop deflector 300 shown in FIG. 6. Additionally, FIG. 8 illustrates a cross-sectional view of the unloading system 112 shown in FIG. 6 taken about line 8,10-8,10, with the deflector 300 shown in FIG. 7 being installed therein.

As particularly shown in FIG. 6, the unloading system 112 may generally be configured the same as or similar to the configuration of the system described above with reference to FIGS. 2-5 and, thus, may include a crop delivery apparatus 164 for receiving crop material 106 from the crop storage tank 108 and for delivering such crop material 106 to an unloading structure 132 including a belt-in-tube conveyer, which then allows the crop material 106 to be conveyed to a corresponding discharge location 130 (FIG. 2) of the system 112. However, as shown in FIG. 6, unlike the embodiment described above, the unloading system 112 further includes a crop deflector 300 positioned within the unloading structure 132. In general, the deflector 300 may be configured to be positioned within the unloading structure 132 such that at least a portion of the flow of crop material 106 expelled or propelled from the crop delivery apparatus 164 contacts the deflector 300 and is directed downwardly towards the belt 214. As shown in FIGS. 6 and 7, the deflector 300 may include a first or upstream end 302 configured to positioned closest to the crop delivery apparatus 164 and a second or downstream end 304 opposite the upstream end 304 that is positioned further away from the crop delivery apparatus 164. Additionally, the deflector 300 may be configured to define a length 306 as it extends lengthwise within the unloading structure 132 between its upstream and downstream ends 302, 304. It should be appreciated that, in several embodiments, the length 306 of the deflector 300 may be selected such that it is long enough to effectively deflect the crop material 106 towards the conveyer belt 214 without cancelling the acceleration of the flow of crop material 106 towards the discharge location 130 while being short enough to prevent the deflector 300 from adding unnecessary weight to the unloading system 112. For example, in one embodiment, the length 306 of the deflector 300 may range from 10% of the inner diameter 208 of the conveyer tube portion 202 to 500% of the inner diameter 208 of the conveyer tube portion 202, such as from 25% of the inner diameter 208 to 400% of the inner diameter 208, or from 50% of the inner diameter 208 to 300% of the inner diameter 208, or from about 100% of the inner diameter 208 to about 300% of the inner diameter 208.

As particularly shown in FIG. 7, the deflector 300 may include both an inner side 308 and an outer side 310 extending between its upstream and downstream ends 302, 304, with the inner side 306 being configured to face towards the interior of unloading structure 132 and the inner surface 216 of the belt 214 while the outer side 310 may be configured to face towards the outer perimeter of the unloading structure 132. In general, the outer side 310 of the deflector 300 may be configured to generally match the inner contour 312 (FIG. 6) of the portion of the unloading structure 132 to which it is mounted. For example, the deflector 300 is shown in FIG. 6 as being positioned within and mounted to the upper section 210 of the conveyor tube portion 202 of the unloading structure 132, with the upstream end 302 of the deflector 300 being positioned adjacent to and/or aligned with the intake end 206 of the conveyor tube portion 202. In such an embodiment, since the conveyor tube portion 202 has a substantially circular cross-section, the outer side 310 of the deflector 300 is shown as having a generally semi-circular shape to match the corresponding inner contour 312 of the conveyer tube portion 202, with the deflector 300 defining a radius of curvature 314 (FIG. 8) that is substantially equal to the radius of the conveyer tube portion 202. However, it should be appreciated that, in other embodiments, the deflector 300 may be positioned at any other suitable location within the unloading structure 132 such that at least a portion of the flow of crop material 106 expelled from the crop delivery apparatus 164 contacts the deflector 300. For example, in one alternative embodiment, the deflector 300 may be installed within the unloading structure 132 such that the deflector 300 is positioned entirely within the transition tube portion 200 of the unloading structure 132 or at least partially positioned within both the conveyor tube portion 202 and the transition tube portion 200.

As particularly shown in FIG. 7, the inner side 308 of the deflector 300 extends between the upstream and downstream ends 302, 304 of the deflector 300 and includes both a radially inwardly converging portion 316 and a planar portion 318. The converging portion 316 of the inner side 308 of the deflector 300 may be configured to extend from the upstream end 302 of the deflector along a given portion of the deflector's length 306 (e.g., at least 50% of the length 306 of the deflector 300) and may generally be shaped to define a radially inwardly converging profile or contour such that at least a portion of the flow of crop material 106 contacting the inner side 308 of the deflector 300 is directed downwardly towards the belt 214 extending within the unloading structure 132. In particular, the radially inwardly converging profile or contour of the converging section 316 may be selected such that the flow of crop material 106 contacting the inner side 308 of the deflector 300 is directed towards the center line 228 of the belt 214, thereby preventing crop material 106 from flowing towards the sides of the belt 214 (and potentially between the belt 214 and the conveyer tube portion 202). In several embodiments, the radially inwardly converging profile may generally taper along the inner side 308 of the deflector 300 from the upstream end 302 towards the downstream end 304. For example, as shown in FIG. 7, in one embodiment, the converging portion 316 may be cone-shaped, with a base end 320 of the converging portion 316 being coincident with the upstream end 302 of the deflector 300 and a point of convergence 322 of the converging portion 316 being spaced apart from the base end 320 in the direction of the downstream end 304 of the deflector 300, the converging portion 316 ending at the point of convergence 332. However, in other embodiments, the converging portion 316 may define any other suitable radially inwardly converging profile or contour, such as by being frustoconical-shaped or pyramidal-shaped. While shown as tapering at a constant rate towards a point of convergence 322, the radially inwardly converging profile may, in another embodiment, non-linearly taper towards the downstream end 304 of the deflector 300. The point of convergence 322 may be vertically aligned with the center point 238 of the conveyor tube portion 202. In a further embodiment, the radially inwardly converging profile may not fully converge to a point 322.

As indicated above, by defining a radially inwardly converging contour, the converging portion 316 of the deflector 300 may serve to channel the flow of crop material 106 towards the center of the conveyer tube portion 302 and, thus, towards the center line 228 of the belt 214, thereby preventing the flow of crop material 106 from traveling above the belt 214, especially within the conveyor tube portion 202. Thus, the flow of crop material 106 may be prevented from getting in-between the belt 214 and the conveyor tube portion 202, thereby reducing the likelihood of traction issues.

Figure 9:
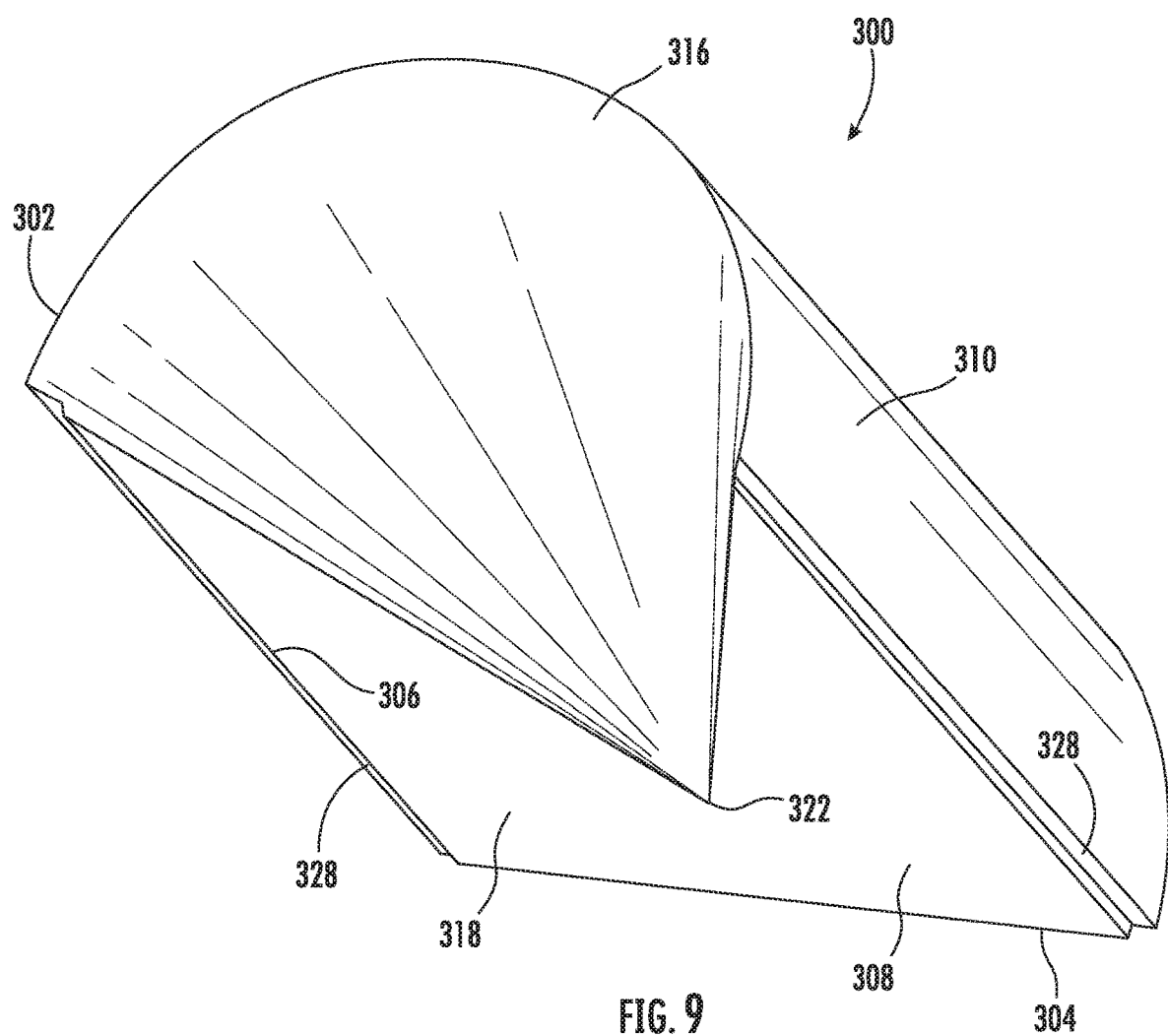
FIG. 9 illustrates a perspective view of another embodiment of a deflector suitable for use with the unloading system shown in FIG. 6 in accordance with aspects of the present subject matter.
Figure 10:
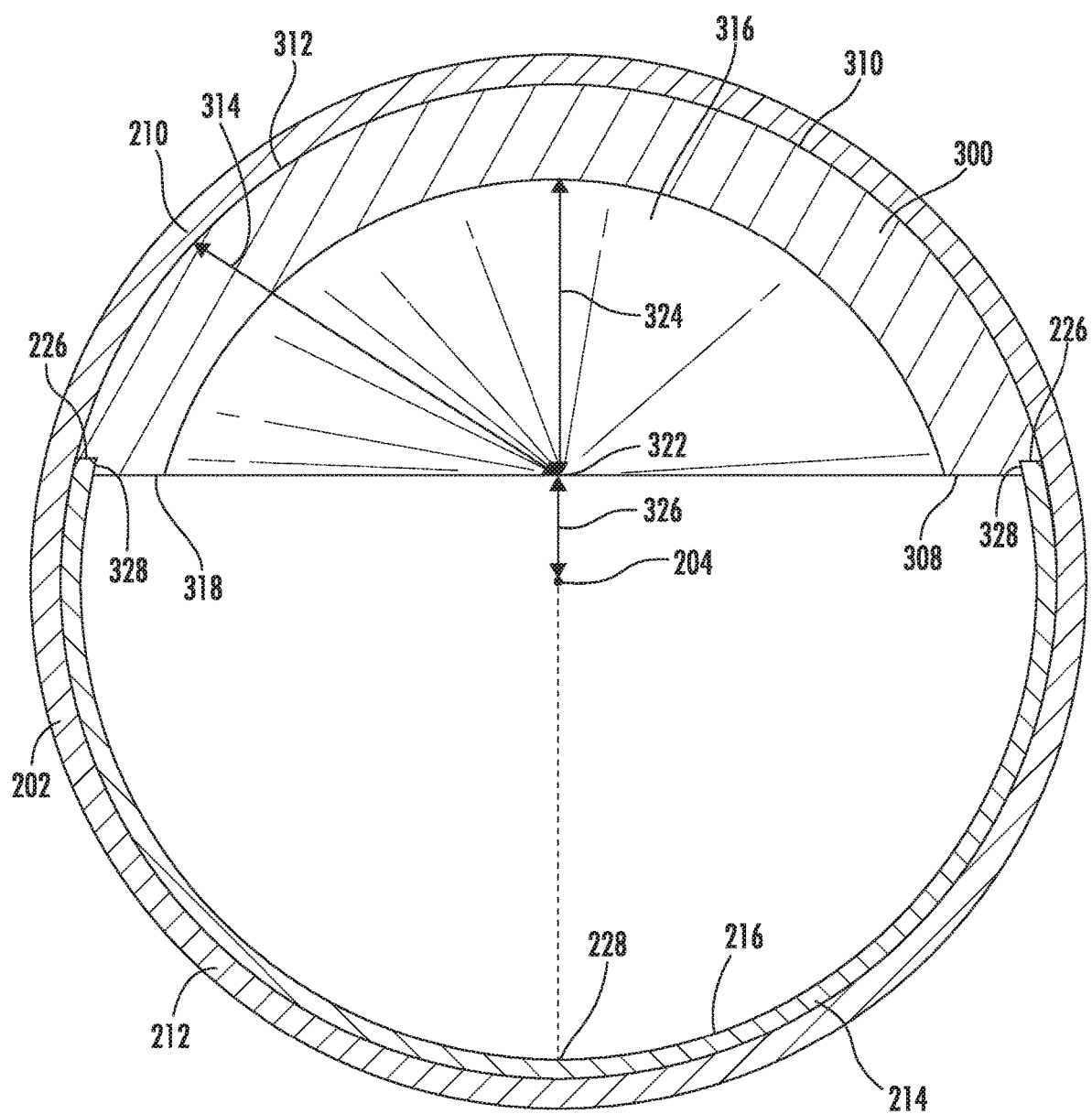
FIG. 10 illustrates a cross-sectional view of the conveyor tube portion of the unloading system shown in FIG. 6 taken about line 8,10-8,10, particularly illustrating the embodiment of the deflector shown in FIG. 9 installed within the conveyor tube portion in accordance with aspects of the present subject matter.

As particularly shown in the cross-sectional view of FIG. 8, the deflector 300 may, in one embodiment, be sized and shaped such that the inner side 308 of the deflector 300 is positioned adjacent to the upwardly facing edges 226 of the belt 214. For example, in one embodiment, the deflector 300 may have a height 324 that is equal to or less than the radius of the conveyor tube portion 202 (i.e., approximately half of inner diameter 208), with the height 324 being defined as the vertical distance between the outer side 310 and the planar portion 318 of the deflector 300 above the center point 238 of the conveyor tube portion 202. As shown in FIG. 8, the upwardly facing edges 226 of the belt 214 may pass directly below the inner side 308 of the deflector 300 during operation of the unloading system 112, with the belt being configured such that the upwardly facing edges 226 contact or pass directly adjacent to the inner side 308 of the deflector 300. In such an embodiment where the height 324 of the deflector 300 is less than the radius of the conveyor tube portion 202, the planar portion 318 is separated from the longitudinal axis 204 of the conveyor tube portion 202 by a vertical distance 326. In such an embodiment, the belt is configured such that the upwardly facing edges 226 extend above the longitudinal axis 204 of the conveyor tube portion 202 along the vertical distance 326 and pass directly adjacent to the inner side 308 of the deflector 300. In one embodiment, contact between the deflector 300 and the belt 214 may provide an additional means for preventing crop material 106 from getting in-between the belt 214 and the conveyor tube portion 202 as the crop material 106 contacts the deflector 300 and falls downwardly onto the belt 214, in other embodiments, the deflector 300 may be configured to extend vertically below the upwardly facing edges 226 of the belt 214, in which case the deflector 300 may define suitable features for accommodating a portion(s) of the belt 214 extending at or adjacent to the upwardly facing edges 226. For example, FIGS. 9 and 10 illustrate an alternative embodiment of the deflector 300 described above with reference to FIGS. 6-8. Specifically, FIG. 9 illustrates a side perspective view of the alternative embodiment of the crop deflector 300. Additionally, FIG. 10 illustrates a cross-sectional view of the unloading system 112 shown in FIG. 6 taken about line 8,10-8,10, with the deflector 300 shown in FIG. 9 being installed therein.

As shown in FIG. 9, the deflector 300 may define at least one track or channel (e.g., a pair of channels 328) extending along the planar portion 318 of its inner side 308 between the upstream and downstream ends 302, 304 of the deflector 300. In such an embodiment, as shown in FIG. 10, when the deflector is installed within the conveyer tube portion 202, the channels 328 may be configured to receive the upwardly facing edges 226 of the belt 214. Such vertical overlap between the deflector 300 and the belt 214 may ensure that the belt 214 substantially conforms to, or follows, the contour of the lower section 212 of the conveyor tube portion 202 such that a gap is not formed between the belt 214 and the conveyor tube portion 202. Additionally, such vertical overlap between the deflector 300 and the belt 214 may provide an additional means for preventing crop material 106 from getting in-between the belt 214 and the conveyor tube portion 202 as the crop material 106 contacts the deflector 300 and falls downwardly onto the belt 214.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An unloading system for a harvester, the unloading system comprising:
   a crop delivery apparatus defining an outlet through which a flow of crop material is expelled;
   an unloading structure configured to receive the flow of crop material from the outlet of the crop delivery apparatus, the unloading structure including a conveyor tube portion extending along a longitudinal axis, the conveyor tube portion defining a passage therethrough having an open intake end;
a belt extending from the intake end through the passage for transporting the flow of crop material through the conveyor tube portion; and
a deflector extending within the unloading structure such that at least a portion of the flow of crop material received from the crop delivery apparatus contacts the deflector and is directed towards at least a portion of the belt,
wherein the deflector extends between an upstream end of the deflector and a downstream end of the deflector,
wherein an inner side of the deflector is spaced radially inwardly from an inner surface of the unloading structure.

2. The unloading system of claim 1, wherein the deflector defines a length between the upstream and downstream ends, the length being equal to a distance ranging from 10% of a diameter of the conveyor tube portion to 500% of the diameter of the conveyor tube portion.

3. The unloading system of claim 1, wherein the deflector includes an outer side extending between the upstream and downstream ends, the outer side of the deflector being coupled to an inner surface of a portion of the unloading structure, the outer side of the deflector substantially matching a contour of the portion of the unloading structure to which it is coupled.

4. The unloading system of claim 1, wherein the conveyor tube portion includes an upper section and a lower section, the belt extending circumferentially through the passage along the lower section of the conveyor tube portion, the deflector being positioned at least partially within the upper section of the conveyor tube portion.

5. The unloading system of claim 4, wherein the deflector is positioned within the conveyor tube portion such that the upstream end of the deflector is disposed adjacent to the open intake end of the conveyor tube portion.

6. The unloading system of claim 1, wherein the unloading structure further comprises a transition tube portion extending between the outlet of the crop delivery apparatus and the open intake end of the conveyor tube portion, the deflector being positioned at least partially within the unloading structure such that the upstream end of the deflector is positioned within the transition tube portion.

7. The unloading system of claim 1, wherein the inner side of the deflector extends between the upstream and downstream ends, the inner side defining a radially inwardly converging contour.

8. The unloading system of claim 7, wherein the radially inwardly converging contour is cone-shaped.

9. The unloading system of claim 7, wherein the inner side of the deflector is disposed within the unloading structure directly adjacent to upwardly facing edges of the belt.

10. The unloading system of claim 7, wherein the deflector defines a channel extending along the inner side such that an upwardly facing edge of the belt is received within the channel.

11. The unloading system of claim 5, wherein the open intake end of the conveyor tube portion is defined where the belt first contacts the conveyor tube portion, and
wherein the conveyor tube portion has a constant cross-sectional profile.

12. The unloading system of claim 11, wherein the constant cross-sectional profile of the conveyor tube portion is circular.

13. The unloading system of claim 1, wherein the deflector is positioned at least partially within the conveyor tube portion such that an internal cross-sectional area of the tube portion taken perpendicular to the longitudinal axis at the deflector is smaller than an internal cross-sectional area of the tube taken perpendicular to the longitudinal axis and spaced apart from the deflector.

14. A harvester, comprising:
a crop processing system for harvesting crop materials;
a grain tank configured to receive the harvested crop materials from the crop processing system;
an elevator assembly configured to receive the harvested crop materials from the grain tank, the elevator assembly having a housing defining an outlet through which a flow of the harvested crop materials is expelled;
an unloading structure configured to receive the flow of harvested crop materials from the elevator assembly, the unloading structure including a conveyor tube portion extending along a longitudinal axis, the conveyor tube portion defining a passage therethrough having an open intake end;
a belt extending from the intake end through the passage for transporting the harvested crop material through the conveyor tube portion; and
a deflector extending within the unloading structure such that at least a portion of the flow of harvested crop materials received from the elevator assembly contacts the deflector and is directed towards at least a portion of the belt,
wherein the deflector extends between an upstream end of the deflector and a downstream end of the deflector,
wherein an inner side of the deflector is spaced radially inwardly from an inner surface of the unloading structure.

15. The harvester of claim 14, wherein the deflector includes an outer side extending between the upstream and downstream ends, the outer side of the deflector being coupled to an inner surface of a portion of the unloading structure, the outer side of the deflector substantially matching a contour of the portion of the unloading structure to which it is coupled.

16. The harvester of claim 14, wherein the conveyor tube portion includes an upper section and a lower section, the belt extending circumferentially through the passage along the lower section of the conveyor tube portion, the deflector being positioned at least partially within the upper section of the conveyor tube portion.

17. The harvester of claim 16, wherein the deflector is positioned within the conveyor tube portion such that the upstream end of the deflector is disposed adjacent to the open intake end of the conveyor tube portion.

18. The harvester of claim 14, wherein the unloading structure further comprises a transition tube portion extending between the outlet of the elevator assembly and the open intake end of the conveyor tube portion, the deflector being positioned at least partially within the unloading structure such that the upstream end of the deflector is positioned within the transition tube portion.

19. The harvester of claim 14, wherein the inner side of the deflector extends between the upstream and downstream ends, the inner side defining a radially inwardly converging contour.

20. The harvester of claim 19, wherein the radially inwardly converging contour is cone-shaped.

* * * * *